US012337239B1

(12) United States Patent
Ibanez et al.

(10) Patent No.: US 12,337,239 B1
(45) Date of Patent: Jun. 24, 2025

(54) SYSTEM AND METHOD FOR SELF-LEARNING, ARTIFICIAL INTELLIGENCE CHARACTER SYSTEM FOR ENTERTAINMENT APPLICATIONS

(71) Applicant: SYNCHROVERSE GAMING LLC, Miami, FL (US)

(72) Inventors: Luis Javier Ibanez, Ave Maria, FL (US); Nelson Johan Vega, Royal Palm Beach, FL (US)

(73) Assignee: Synchroverse Gaming LLC, Miami, FL (US)

( * ) Notice: Subject to any disclaimer, the term of this patent is extended or adjusted under 35 U.S.C. 154(b) by 0 days.

(21) Appl. No.: 18/763,410

(22) Filed: Jul. 3, 2024

Related U.S. Application Data

(60) Provisional application No. 63/524,772, filed on Jul. 3, 2023.

(51) Int. Cl.
*A63F 13/67* (2014.01)
*A63F 13/537* (2014.01)

(52) U.S. Cl.
CPC .......... *A63F 13/67* (2014.09); *A63F 13/537* (2014.09)

(58) Field of Classification Search
CPC ... A63F 13/67; A63F 2300/535; A63F 13/537
See application file for complete search history.

(56) References Cited

U.S. PATENT DOCUMENTS

| | | | |
|---|---|---|---|
| 7,025,675 B2* | 4/2006 | Fogel | A63F 13/12 463/9 |
| 7,789,758 B2 | 9/2010 | Wright | |
| 7,814,041 B2 | 10/2010 | Caporale et al. | |
| 9,895,612 B2 | 2/2018 | Pacey et al. | |
| 10,112,113 B2 | 10/2018 | Krishnamurthy | |
| 10,379,719 B2* | 8/2019 | Scapel | G06V 40/175 |
| 10,424,318 B2 | 9/2019 | Levy-Rosenthal | |
| 10,864,443 B2 | 12/2020 | Eatadali et al. | |
| 10,926,173 B2 | 2/2021 | Shah et al. | |
| 10,926,179 B2 | 2/2021 | de Plater et al. | |
| 11,461,952 B1 | 10/2022 | Bosnak et al. | |
| 2002/0082077 A1* | 6/2002 | Johnson | A63F 13/58 463/43 |
| 2004/0029625 A1 | 2/2004 | Annunziata | |

(Continued)

OTHER PUBLICATIONS

"Integrate customizable avatars into your game or app in minutes," https://readyplayer.me/ [Date accessed: Apr. 2, 2023].

(Continued)

*Primary Examiner* — Steve Rowland
(74) *Attorney, Agent, or Firm* — Bold IP, PLLC; Christopher Mayle

(57) ABSTRACT

A system and method where a player's chosen virtual character, either user personalized or pre-made, is able to infinitely learn from all the interactions that it has either with the player, other characters, non-player characters (NPCs), or game match experiences/results, whereby virtual character is then able to communicate with the player in a natural language voice and physical interaction in a separate environment, whereby the personality of the character virtual character is constantly shaped by the backstory and experiences it has in the applications it has been connected to or has been in communication with.

12 Claims, 5 Drawing Sheets

(56) References Cited

U.S. PATENT DOCUMENTS

| | | | |
|---|---|---|---|
| 2004/0053690 A1* | 3/2004 | Fogel | A63F 13/30 463/31 |
| 2010/0240458 A1* | 9/2010 | Gaiba | A63F 13/42 463/36 |
| 2011/0294574 A1* | 12/2011 | Yamada | A63F 13/52 463/43 |
| 2013/0079142 A1* | 3/2013 | Kruglick | A63F 13/61 463/43 |
| 2015/0126286 A1 | 5/2015 | Guo | |
| 2019/0081848 A1* | 3/2019 | Zou | H04W 4/026 |
| 2019/0095775 A1 | 3/2019 | Lemberksy et al. | |
| 2020/0001185 A1* | 1/2020 | Eatedali | A63F 13/65 |
| 2020/0051460 A1* | 2/2020 | Bedor | G09B 19/22 |
| 2020/0384362 A1 | 12/2020 | Shah et al. | |
| 2021/0390366 A1 | 12/2021 | Furman et al. | |
| 2024/0102981 A1* | 3/2024 | Lemos | G01N 33/0062 |

OTHER PUBLICATIONS

"Metasoul," https://emoshape.com/metasoul-3/ [Date accessed: Apr. 2, 2023].

* cited by examiner

SYSTEM AND METHOD FOR SELF-LEARNING, ARTIFICIAL INTELLIGENCE CHARACTER SYSTEM FOR ENTERTAINMENT APPLICATIONS

CROSS REFERENCE TO RELATED APPLICATIONS

This application claims priority to U.S. Provisional Patent Application No. 63/524,772 filed on Jul. 3, 2023 which is incorporated in its entirety.

FIELD OF DISCLOSURE

The overall field of this invention generally relates to systems and methods for creating a cross-compatible artificial Intelligence character system with no application, system, or device limitations, which vastly improves limited and robotic interactions between character and the player, creating a self-evolving pre-prompting system that saves any company using the system from having to generate new prompts for duplicate responses throughout their applications.

BACKGROUND

Character creation and interaction has become an increasingly important part in video games. Character creation allows players to personalize their in-game virtual character, giving them a sense of ownership and investment in the game world. It provides an opportunity for players to express their creativity and imagination by designing a character that reflects their preferences, personality, or desired role-playing experience. This engagement can enhance the overall enjoyment and immersion in the game. Character creation allows the players to assume the role of a character and embark on a journey within a narrative-driven world. The ability to customize a character's appearance, attributes, and backstory allows players to shape their own unique protagonist, making the story more personal and tailored to their preferences.

Many systems have tried to use artificial for game characters to provide a more authentic experience. However, these systems are limited to the application that they are housed in and have no way to provide additional more information to the character as they are limited to a specific platform such as a single video game or at most an episodic series of video games. The characters, virtual characters and their information have never traveled between different applications in different systems. Thus, the need exists for an invention that treats the characters data as a universal, self-evolving system that may adapt and learn from different applications and converse with the user in a natural language experience.

SUMMARY

It is an object of the present description to provide a system where a player's chosen virtual character, either user personalized or pre-made, is able to infinitely learn from all the interactions that it has either with the player, other characters, non-player characters (NPCs), or game match experiences/results. The virtual character is then able to communicate with the player in a natural language voice and physical interaction. The personality of the character virtual character is constantly shaped by the backstory and experiences it has in the applications it has been connected to or has been in communication with. The system will load up a predetermined character personality through a "synchro-verse database" or the player upon creation of the character's virtual character will be able to generate their chosen personality based on a series of questions, data points, and character traits. The most important aspect is that the system will feel as if the player is actually conversing with a virtual character on one or more separate platforms and environments, thereby deepening the connection between the player and their chosen virtual character.

The system also creates the possibility of endless storylines based on the player's actions and virtual character personality traits. The system will not only respond with the appropriate verbal response but also through artificial intelligence will be able to choose the correct body and facial animations for the virtual character to express the response more naturally. Another key point is that the synchro-verse database acts as a central point where the system can be integrated into any other type of application and for any other type of character. This allows the platform to offer these services to other companies that may be looking to further personalize their character, their virtual characters, or even NPCs.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
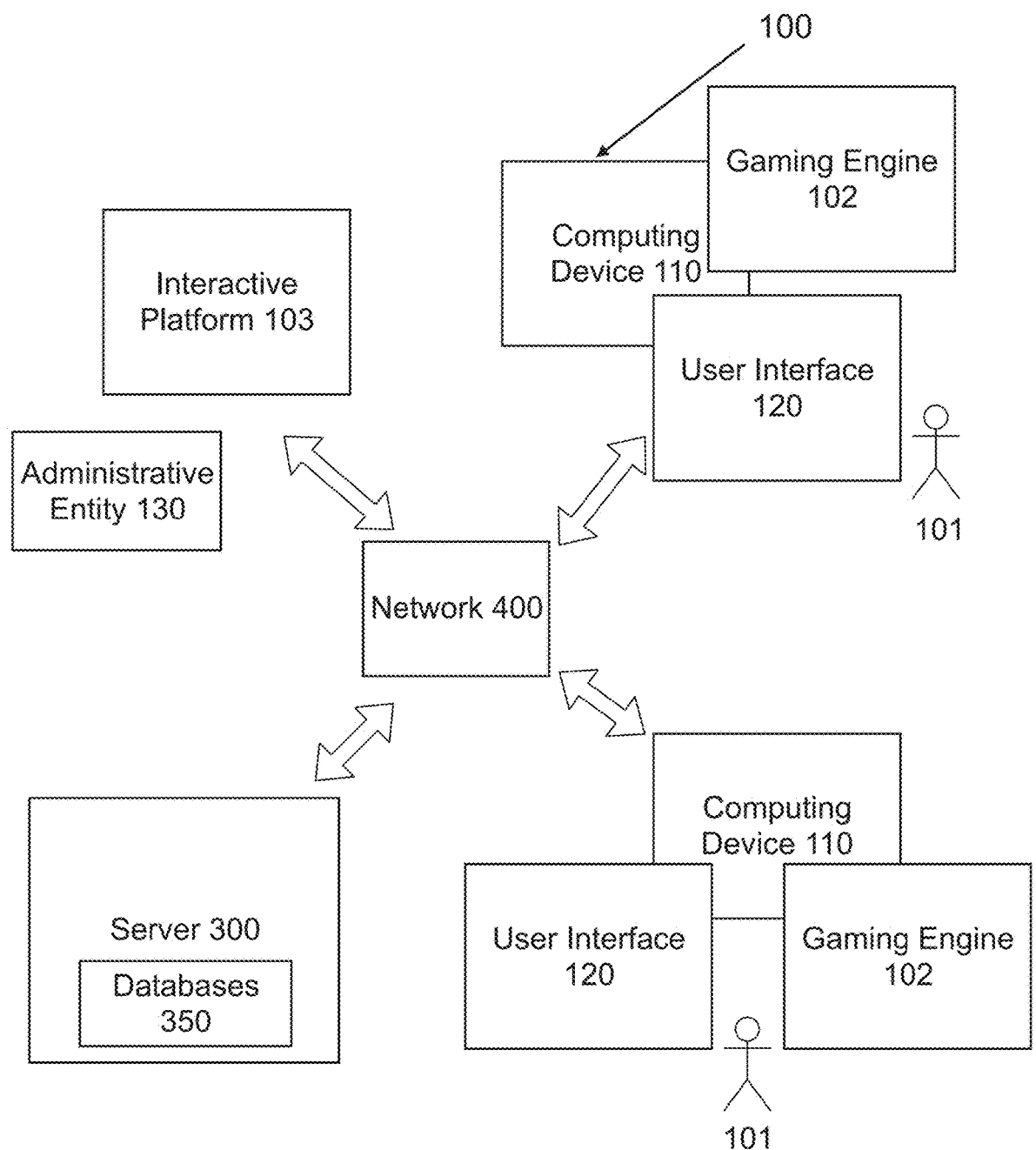
FIG. 1 shows a block diagram of the various connected systems of the interactive virtual character system.

The present invention allows for any virtual character to have a pre-loaded story to shape all their responses, emotion and physical interactions with their environment and the player. The player is also able to randomize the character and their backstory or set their own. These emotions and responses allow for a player to naturally speak and interact with their virtual character as if they were truly alive. The character will self-evolve and learn from interactions with other characters, users, NPCs and its environment, changing all faculties of the characters responses and animations. The application is housed in a proprietary black-box API that calls on all the different systems to perform these actions through any application, thus the character is not limited to any single application, device, or system whereby the virtual character or character can freely move around any application and be able to respond from any and all past experiences. For the purposes of our system, a companion application mimics a video chat experience and uses the system to allow users to freely chat with their virtual character where it will appear as if they are conversing with a real person.

The secondary application may be displayed in augmented reality whereby the character will be displayed in the real world and can simulate walking around and interacting with the physical world as well as interacting verbally with the user. Another application utilized may be an open world sandbox game built on either Unreal Engine or Unity where the system will be integrated to allow the character to interact with the user and follow commands to execute inside the game.

Referring initially to FIGS. 1 and 3-5, one or more embodiments of interactive virtual character system 100 in accordance with the present invention is illustrated. Interactive virtual character system 100 is illustrated as a simplified block architecture diagram consistent with the embodiments of the present disclosure. Interactive virtual character system 100 may include a plurality of computing devices 110. Computing devices 110 may be any number of gaming devices and may include, for example, a processor, for example a central processing unit based on 80×86 architecture as designed by Intel™ or AMD™, or a system-on-a-chip as designed by ARM™. The processor may be communicatively coupled to auxiliary devices or modules of computing devices 110, using a bus or other coupling. Optionally, the processor and some or all of its coupled auxiliary devices or modules may be housed within or coupled to a housing of the computing devices 110.

Computing devices 110 may be any device that includes a computer including, but not limited to, any non-transitory computer-readable medium such as a personal computer, a desktop computer, a laptop computer, a computer notebook, a computer tablet, a smartphone, or other computing device under the philosophy of the internet of things. Computing devices 110 and users 101 may be located in various geographical locations that are either located apart or are located in proximity to each other. As used herein, the terms user and player may be used interchangeably.

In some embodiments, a graphical user interface 120 (GUI) is accessed from computing device 110, including a gaming console, desktop computer, laptop computer, mobile phone, any other mobile device, or any other electronic device. User interface 120 may be designed for providing user control input to a game process operated by a game engine executing on the processor. User interface 120 may have a plurality of buttons or icons that are selectable through user interface 120 for interactive virtual character system 100 to perform particular processes in response to the selections. User interface 120 may include but is not limited to a title bar, toolbars, pull-down menus, tabs, scroll bars, content help, dialog boxes, operating buttons (icons), and status bar that the user navigates throughout the display.

Input may also be provided via a sensor coupled to the processor. A sensor may include, for example, a motion sensor (e.g., an accelerometer), a position sensor, a temperature sensor, a location sensor (for example, a Global Positioning System (GPS) receiver and controller), an image sensor or sensor array, or a microphone. The sensor may detect a motion or other state of a user interface display, for example, motion of a virtual-reality headset, or the bodily state of the user.

In some embodiments, computing devices 110 may be in communication with one or more servers, such as server 300 via one or more networks such as network 400. Server 300 may be located at a data center or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data.

Server 300 may include a front-end web server that is coupled to computing devices 110 and other devices via a network such as the Internet. The front-end web server may provide services, including ticketing and other non-essential services, and login services.

In some embodiments, server 300 may include a back-end web server that is coupled to a computing device 110 via the Internet. The back-end web server may be on the same network or the same machine as a database server. The database server may process and/or store customer and/or asset information associated with the virtual character.

A server may have cloud server infrastructure which may be the collection of hardware and software elements needed to enable cloud computing. Cloud server infrastructure may include computing power, networking, storage, and interface for user access. A virtual private cloud is an on-demand configurable pool of shared computing resources allocated within a public cloud environment, providing a certain level of isolation between different organizations and users.

A control panel may of server 300 may include backend monitoring and a management dashboard of the application and users in the database. The control panel may be used internally to troubleshoot support issues and or manage agencies (i.e., activate or deactivate an agency access). Server 300 may have any number of methods for storing data in the cloud that provides servers and applications access to data through a shared file system.

Server 300 may have a number of modules that provide various functions related to interactive virtual character system 100. Modules may be in the form of software or computer programs that interact with the operating system of server 300 whereby data collected in databases 350 as instruction-based expressions of components and/or processes may be processed by one or more processors within server 300 or another component of computing devices 110 as well as in conjunction with execution of one or more other computer programs. Modules may be configured to receive commands or requests from computing devices 110, server 300, and outside connected devices over network 400.

Server 300 may have a control module with appropriate firmware or software and an operating system to control overall operation and configuration of interactive virtual character system 100. The controller module may be in operable communication with a network interface module which provides interface functionality over one or more networks (wired or wireless) and possibly connectivity with other communication media. The controller module may also be in communication with an audio module and a video module, which receive and process audio and video data, respectively, from one or more connected video cameras or other input devices for users 101 on computing devices 110.

The audio module may include other modules or components for processing audio data, speech detection and recognition modules and codecs for processing incoming or outgoing video data. A speech detection module can be configured to detect instances of speech at a site (for example, to trigger recording or other functions of interactive virtual character system 100), and/or determine the relative physical location of the detected speech for use in controlling the operation of individual microphones on computing devices 110. Speech recognition may be used to distinguish between individual voices for the purpose of filtering out other voices.

The video module may include image recognition modules for use in detecting speech or distinguishing between announcers or other individuals, and appropriate codecs for use in processing incoming or outgoing video data. The image recognition modules may include face tracking or pattern recognition algorithms to identify users 101. The audio and video modules may also include, respectively, interfaces for data communication between input units such as microphones and cameras, and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Interactive virtual character system 100 may also be equipped with security modules providing end-to-end security with other systems and intermediate host systems.

Database 350 represents a series of data that is managed by a database management system, also called electronic database, and are structured to facilitate the storage, retrieval, modification, and deletion of data in conjunction with various data-processing operations of various interactive games including the updated profile of one or more virtual characters associated with the user. The database is an organized collection of data, generally stored and accessed electronically from various components connected over network 400. Database 350 may be physically or logically divided into one or more separate databases where each database is associated with a particular law enforcement agency. Thus, when user 101 logs in to interactive virtual character system 100, user 101 is directed to the database associated with the user's character where user 101 may then manage the assets of their characters to the permissions granted to user 101.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including a telecommunications network, a wireless network (including Wi-Fi), and a wireline network. Network 400 may include mobile telephone networks utilizing any protocol or protocols used to communicate among mobile digital computing devices (e.g., computing device 110), such as GSM, GPRS, UMTS, AMPS, TDMA, or CDMA. In one or more non-limiting embodiments, different types of data may be transmitted via network 400 via different protocols. In alternative embodiments, computing devices 110, may act as standalone devices or whereby they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices 110 if for instance they are in a remote location not accessible by other networks.

Interactive virtual character system 100 may also include one or more administrative entities such as administrative entity 130. While administrative entity 130 is depicted as a single element communicating over network 400, administrative entity 130 in one or more non-limiting embodiments may be distributed over network 400 in any number of physical locations. Administrative entity 130 may manipulate the software and enter commands to server 300 using any number of input devices such as keyboard and mouse. The input/output may be viewed on a display screen to administrative entity 130.

Figure 2:
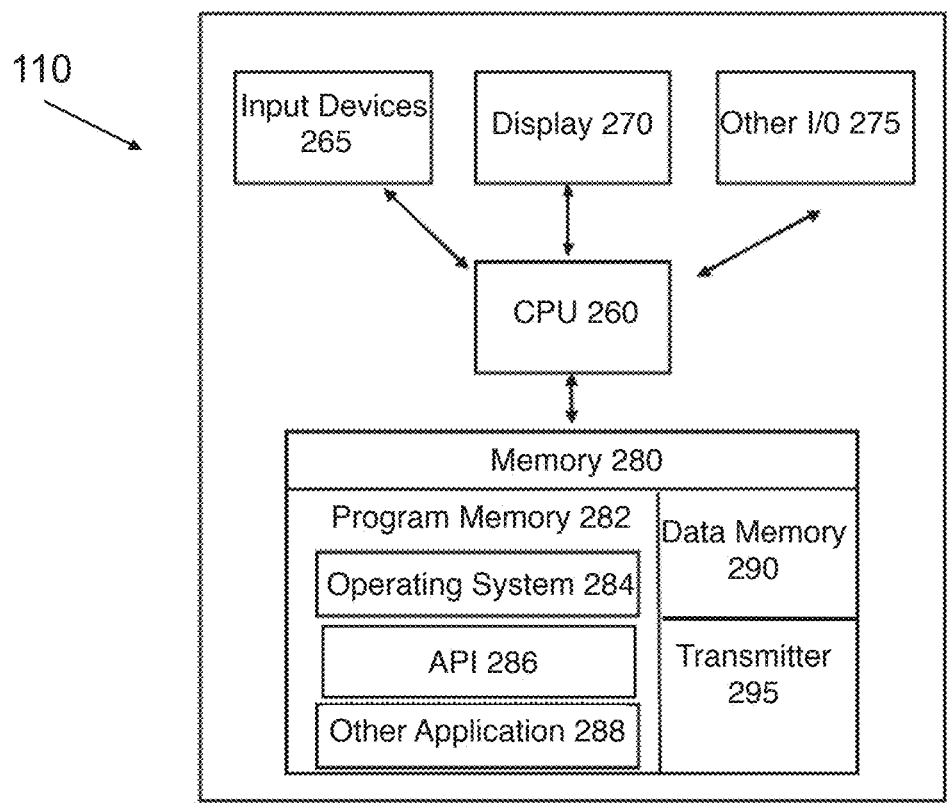
FIG. 2 shows an exemplary block diagram of various components of a computing device.
Figure 3:
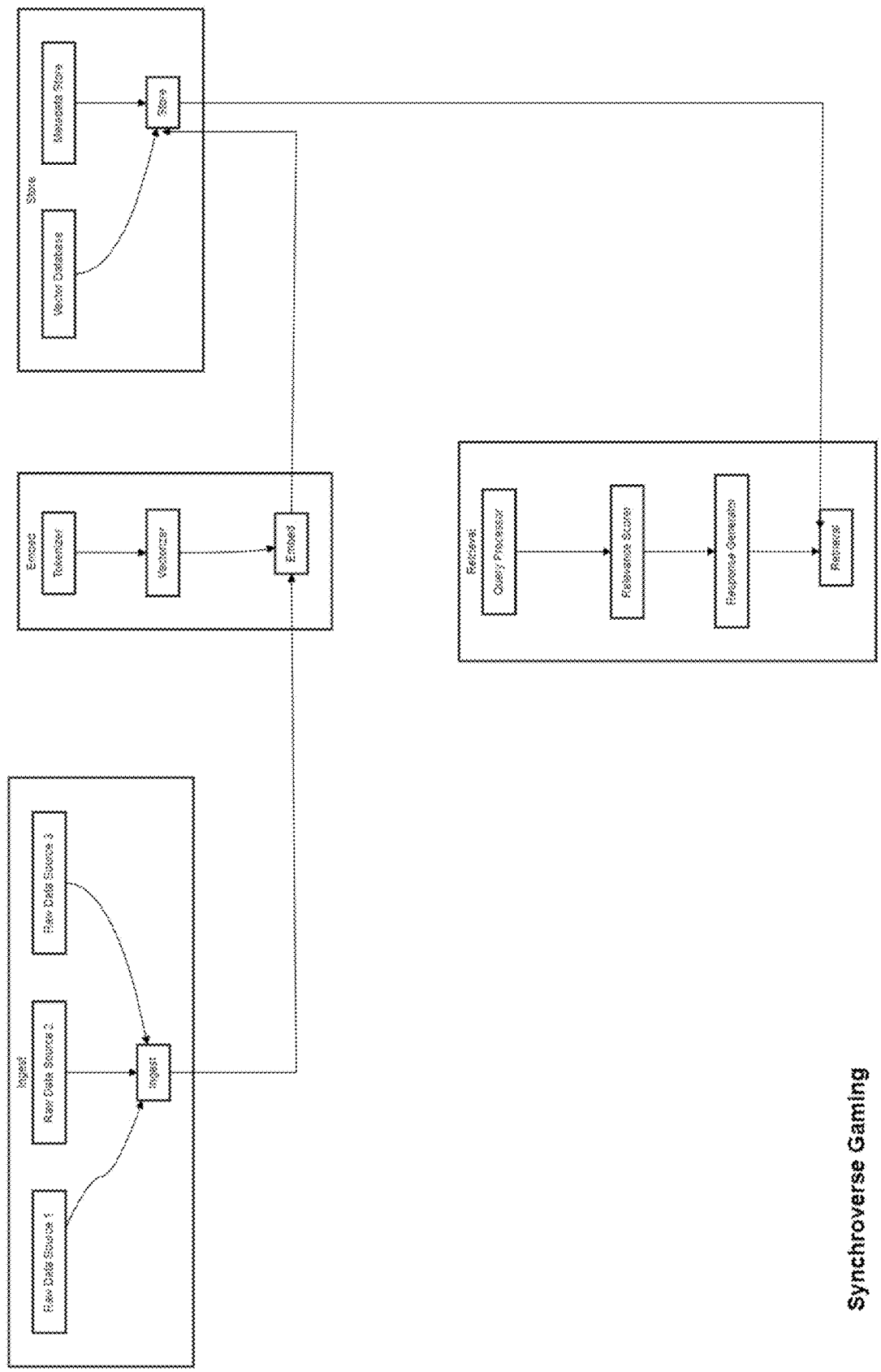
FIG. 3 shows another block diagram of the various connected systems of the interactive virtual character system.
Figure 4:
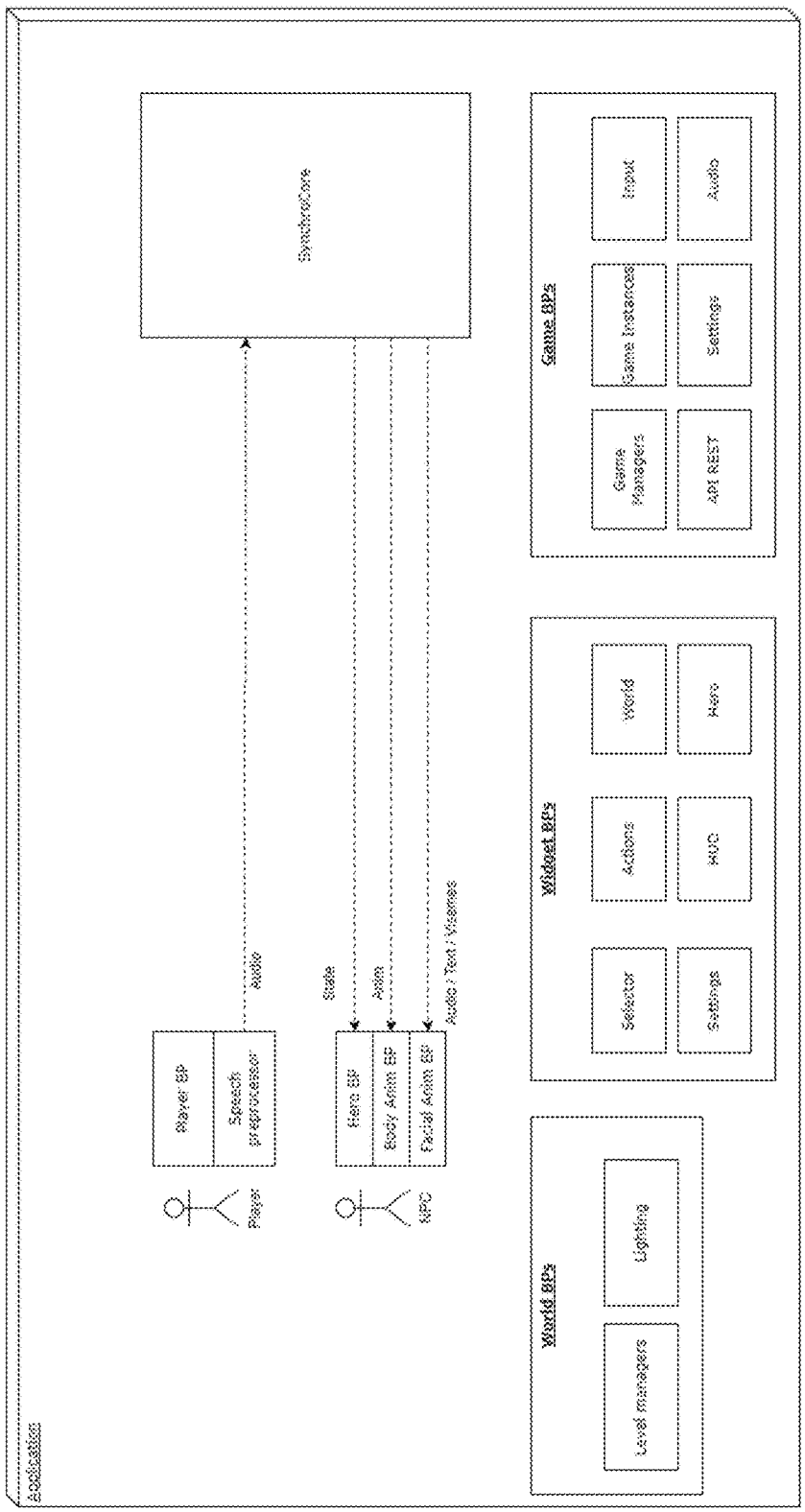
FIG. 4 shows another block diagram of the various components systems of the interactive virtual character system.
Figure 5:
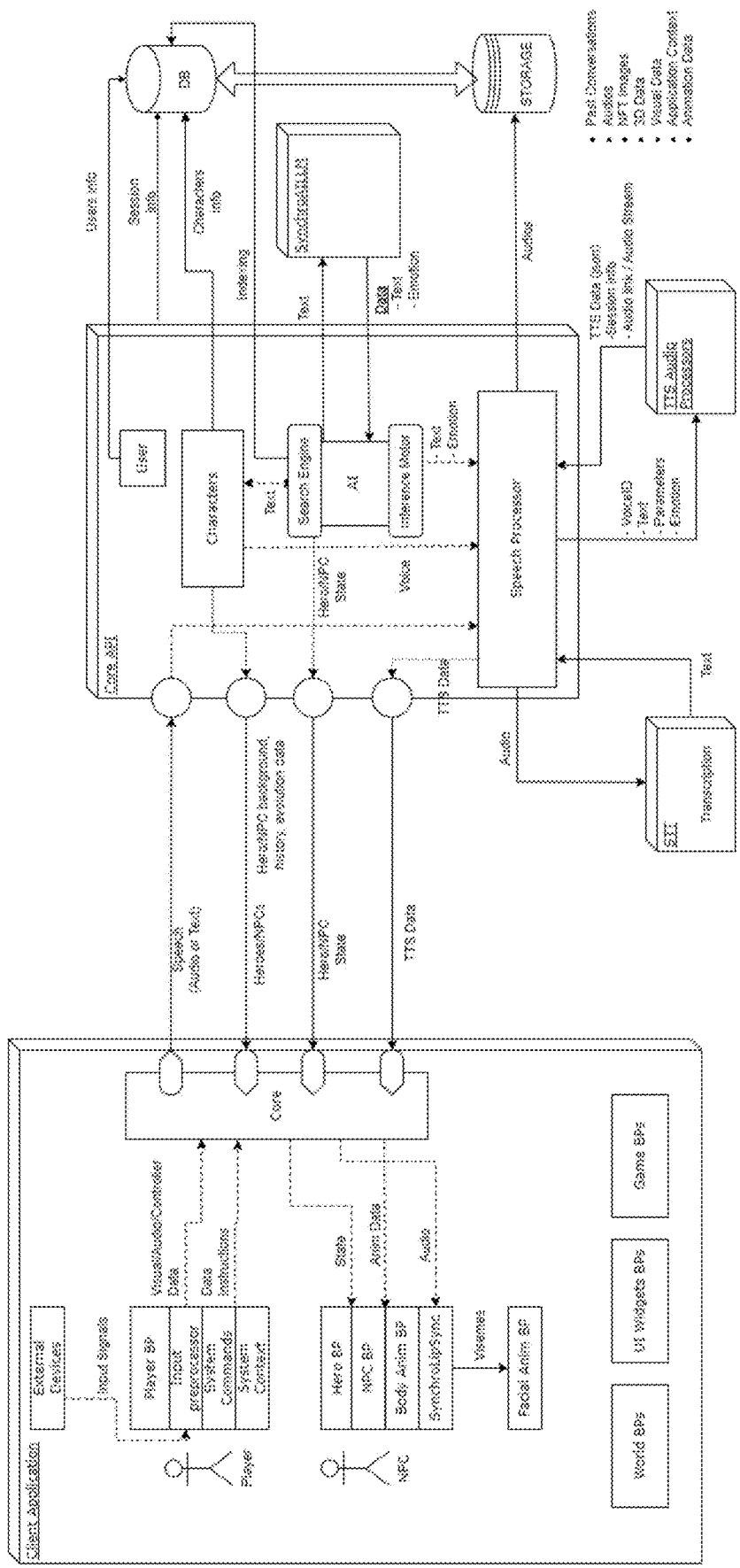
FIG. 5 shows another block diagram of the various connected systems of the interactive virtual character system.

Turning to FIG. 2, FIG. 2 is a block diagram showing various components of a computing device 110. Computing device 110 may comprise a housing for containing one or more hardware components that allow access to edit and query interactive virtual character system 100. Computing device 110 may include one or more input devices such as input devices 265 that provide input to a CPU (processor) such as CPU 260 of actions related to a user 101. Input devices 265 may be implemented as a controller, a joystick, a keyboard, a touchscreen, a mouse, via voice activation, wearable input device, a camera, a trackball, or a microphone.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen or an LED display screen. Display 270 may also comprise a touch screen interface operable to detect and receive touch input such as a tap or a swiping gesture.

Display 270 may be a binocular head mounted display (HMD), head mounted goggles (HMG), an augmented reality device, virtual reality glasses, a scope simulator, a hologram projector, a monocular simulator, a binoculars simulator, a telescope simulator, Google Glass™ or another form of device that is connectable to the computing device whereby users may view a virtual environment through the display. Interactive virtual character system 100 may also use any latest video and audio rendering technologies to accomplish the goal of the present invention instead of or in combination with virtual reality or augmented reality.

In some embodiments, the computing device 110 may be capable of displaying an augmented reality view through a camera, sensor, or other method. The system may have a creation module that may be configured so that users 101 may interact with the virtual character in an augmented reality view by inserting annotations, comments, virtual objects, pictures, audio, and video, to locations within range of the event or the device. The virtual objects may include virtual characters or static virtual objects, and any other virtual objects that can be rendered by the augmented reality networking system.

In one or more non-limiting embodiments, display 270 may be a mobile device or other device. The camera of a mobile device may capture video of the surrounding area so that user 101 may interact with the augmented reality view by inserting annotations, comments, virtual objects, pictures, audio, and video to locations within range of computing device 110. The virtual objects may include virtual characters, static virtual objects, and any other virtual objects that can be rendered by the augmented reality networking system built within the system.

Computing devices 110 may include a plurality of detectors mounted or otherwise connected to the housing of computing devices 110 or other connected components. Computing devices 110 may have infrared ("IR") detectors having photodiodes and related amplification and detection circuitry to sense the presence of people in the room or location or connected devices. In other embodiments, computing devices 110 may include radio frequencies, magnetic fields, and ultrasonic sensors. Detectors may be arranged in any number of configurations and arrangements on the housing of computing devices 110.

Optical sensors may be used whereby a prism, light source, and light sensor capture images of fingerprints. In other non-limiting embodiments, computing device 110 may use one or more sensors to identify vein patterns and provide real-time measurements of heart rate, heart rate variability, brain waves, blood flow, blood pressure, and any other biometrics. Computing devices 110 may have one or more infrared (IR) sensors utilizing a high dynamic range to allow for more detailed image capturing of the biometric data provided by user 101.

Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data which may be provided to program memory 282 or any element of computing device 110.

Server 300 may have management module to manage sharing of data information between interactive games played by users 101. Managing of sharing may include, for example, detecting conditions that trigger the transmitting of a virtual character when a user is attempting to start different games and providing parameters to interactive games, optionally via network 400. Databases 350 may act as an interconnected database system. Databases 350 may store information provided by the user and use it for prompt pre-processing. Database 350 may store information learned from another character or NPC and use it for prompt pre-processing. Database 350 may store 3D character physical animation information. Database 350 may store game statistical information and use it for prompt pre-processing.

Databases 350 may store any number of virtual character parameters including appearance parameters. Appearance parameters may be uniquely assigned to the virtual character and may include, for example, face, body type, body parts, hairstyles, behaviors, voices, animations, or other parameters. Databases 350 may store any number of biological traits such as personality, name, and/or title of the virtual character. Limits may be applied to how much appearance parameters are allowed to change between interactive game environments in different interactives to not dramatically affect the purpose sought out by the interactive. Virtual character parameters may further include relationship parameters. Interactive virtual character system 100 may define different kinds of relationships with virtual character. For example, the game engine may define a marriage between the virtual character and another character or a sworn enemy rival with yet another character, and consequently the player may find or mention these characters in other games. Other relationships may include, for example, friend, follower, or other relationship useful for game play.

An example method of insertion of a virtual character into different interactive games may begin by user 101 requesting to have virtual character inserted into a first interactive video game on a computing device 110. Server 300 receives the request for digital asset data from interconnected databases 350. The request may be for the digital asset identification information of the virtual character, for digital asset characteristics of the virtual character including but not limited to just physical traits, animations, personality traits, or all historical information that has been associated and collected to create the current form of the virtual character. The virtual character, including one or more characteristics, is sent to the first interactive game or a plurality of interactive games, either directly or indirectly. Examples of indirect sending include sending the virtual character via a real-world object, another computer, or a handheld device.

The performance of the interactive game is then affected by the one or more received characteristics of the virtual character. For example, improved character statistics can affect a character's personality or abilities in a game. Additional history of events can affect dialogue and story paths. Visual characteristics can affect the display of characters or environments when displayed to user 101 through the interactive video game. These are non-limiting examples, and various other examples will be appreciated by those of ordinary skill in the art.

Server 300 then receives updated characteristic data from the interactive game. The interactive game from which updated characteristic data is received may be the same one or more interactive game to which all or a portion of the virtual character data is previously sent or different interactive game, and/or overlapping interactive game. This updated characteristic data can include data for altering, adding, or replacing particular characteristics of the virtual character or data that can be processed to alter particular characteristics of the virtual character. Additional data can include, for instance, data providing a new relationship, new accessory, new trait, new physical appearance, new history item, new account detail, new game state, etc. This updated characteristic data, for instance, can be generated by actions that occurred during interaction with interactive games by the user.

Server 300 then stores this information in databases 350 and alters one or more characteristics of the virtual character based on the updated characteristic data received from the first interactive game. In some example embodiments, server 300 may provide any number of security checks before transmitting and receiving digital information such as by but not limited to a digital handshake, exchange of passwords, or receipt of passwords to confirm that the interactive video game has the authority to alter the particular characteristic data. If a past prompt is similar enough, it will call on that prompt. This altered characteristic may then be sent to another interactive video game and affect the performance of that interactive game.

Next (or separately), server 300 may receive a request for digital asset data of the virtual character from a second interactive game (directly or indirectly) or plurality of interactive games that is/are different from the first interactive game but in some embodiments may include the first interactive game (such as a sequel or episodic content). For example, the second interactive game may be on a second computing device 110. This second interactive game can provide a different universe for a similar media channel (for instance a second console video game, where the first media channel was a first console video game).

In another embodiment, the second media source is for a different media channel. For example, if the first media channel is a console video game, the second media channel is a handheld puzzle game, non-interactive movie, real-world device, etc. The request again may be for the digital asset identification information of the virtual character, for digital asset characteristics of the virtual character including but not limited to just physical traits, personality traits, or all historical information that has been associated and collected to create the current form of the virtual character. The digital asset data of the virtual character is then transmitted to the second media source, either directly or indirectly. Performance of media by the second media source is affected by the received characteristics of the virtual character.

Server 300, then may receive updated characteristic data from the second interactive game. This updated characteristic data can include data for altering, adding, or replacing particular characteristics. Again, the updated characteristic data can be generated from actions that occurred during play by user 101 during operation of the second interactive game. Such characteristics can include one or more characteristics that were previously altered by the first media source and/or other characteristics. Server 300 then stores this information in databases 350 then alters the characteristic data based on the updated characteristic data from the second media source. Again, this altered characteristic may then be sent to another interactive game (including the first interactive game, the second interactive game, or another interactive game) and affect the performance of the other interactive games when transmitted.

Interactive virtual character system 100 may use any number of integrated functional modules making up an interactive game for performing methods of game play, for example, one or more game engines 102 to be used on one or more interactive games of which the virtual character may be integrated into or built around and where updated characteristics are created. Game engine 102 may determine changes to the virtual character and save the determined changes in a reserve queue for later propagation to server 300. Changes may include any character parameters.

Game engine 102 includes other modules, for example a database module holding game and parameter data to be transmitted to server 300. Data signals generated by a user input device may be provided to a user input processing module. Based on the data signals and the context in which received (e.g., game state at time of receipt), the data processing module may set variables or write data to memory locations that are used by other modules of the game engine, operating concurrently or sequentially with operation of the user input module.

A navigation module may manage position and movement of the player's virtual character, or players' respective virtual characters, through a world map established for a particular game, in response to player input, map features, event outcomes and other game states, including positions and states of non-players characters which may be recorded and transmitted to server 300. The navigation module may similarly manage position and movement of non-player characters through a world map. It should be appreciated that a world map may be divided into different levels. The navigation module may control access of a player's virtual character to different levels. For example, a player may be required, via limits placed on the player's virtual character, to complete a certain task before advancing to a next level. As used herein, the game virtual character controlled in response to player input so as to represent the player in game play may sometimes be referred to as the virtual character.

An encounter module may manage encounters between virtual characters, between virtual characters and non-player characters, or between non-player characters or NPC on one or more interactive games which may be recorded and transmitted to server 300. The encounter module may determine outcomes of encounters in response to player input, status of virtual character parameters, status of non-player character parameters, presence of accessory objects (e.g., weapons, items, prizes, etc.), game location, game time, or other inputs. The encounter module may generate actions of non-player characters based on character parameters using a code that randomly generates actions or selects from a set of available actions, or both. The encounter module may compare the player virtual character action, player virtual character parameters, non-player character actions, and non-player parameters, and determine an outcome.

For example, an encounter may be coded as a "do" loop of processes that are repeated until the loop is exited by a terminal event. Once an outcome of an encounter is determined, the encounter module may record a result for use by other modules of the game engine 102 and be transmitted to server 300. The prompt sent to server 300 may use the encounter module to take in the character's past experiences, behavior, current environment, current application, and mood into account based on the previous encounter when sending over a prompt, which may affect the current mood of the virtual character.

A model management module may manage three-dimensional or two-dimensional models used for rendering characters between interactive games. The model management module may alter a state of these models in response to changes in parameters. For example, the encounter module may provide an indication that a character lost a combat event by suffering a particular type of injury. In response to the indication, the model management module may alter a texture and/or geometry of the model to reflect a scar from the particular injury suffered. The next time the non-player character is rendered, the scar will appear where there was none before. Other character parameters may be static (e.g., character tribe or name) or variable (e.g., acquired traits, rank, or achievements). Traits may be assigned to the virtual character that relate specifically to attributes of the virtual character. Game engine 102 may control dramatic visual modifications to any number of areas based on the identity of the virtual character. For instance, a "Cool Fort" fort may be adorned with large achievement trophies over many surfaces. These traits may vary with time, based on the rank, exploits, victories, and defeats of the virtual character.

In some embodiments, interactive virtual character system 100 may have a specially designed interactive platform 103 whereby user 101 may be able to initially construct a virtual character and then interact with the virtual character whereby the system will store the created virtual characters in databases 350 and update the occurrences and happenings with the virtual character while user 101 is interacting with the virtual character for later transmission to the other interactive games. Interactive platform 103 may have a virtual character creation system with an intuitive and interactive user interface, accessible through computing device 110.

The interface presents users 101 with a step-by-step process for creating virtual characters, guiding them through each customization option in a clear and organized manner. It should be appreciated that the virtual characters may be created in the interactive games whereby server 300 will translate the data in a standardized format to be accessible by interactive platform 103 by user 101. The virtual characters may be created to look like user 101 or a desired character that the user wishes. A virtual character may be modeled on a famous figure or celebrity. Similar to the interactive games, interactive platform 103 provides export functionality to generate virtual character files in various formats, including 3D models, image files, or data files compatible with various software and platforms. Appearance parameters of the virtual character may be modified by the game engine in the interactive games when the virtual character moves to different interactive games.

The system employs computer vision and facial recognition algorithms to capture and analyze a user's facial features. It may utilize a camera or uploaded photographs to identify key landmarks, such as the eyes, nose, mouth, and jawline, and extracts relevant data to replicate these features accurately in the virtual character creation process or may be inserted manually by user 101. Various body shape options may be provided. Users 101 may input their body measurements or desired body measurements manually or use 3D scanning technology to capture precise body shape and proportions.

The system processes this data to create a virtual representation of the virtual character's physique, including height, weight, body mass index, and other relevant parameters. Various hairstyle options may be provided with the ability to adjust length, color, texture, and other attributes. The system may incorporate advanced hair simulation techniques to mimic the natural movement and behavior of different hair types. Users may select from an extensive collection of clothing styles, accessories, and personalization options to dress their virtual characters. The system offers a virtual wardrobe with a wide variety of garments, including tops, bottoms, shoes, accessories, and other customizable elements.

In some embodiments, the virtual character may be constructed using one or more algorithms and machine learning based on the specific desired interactive games. For instance, the virtual characters may be generated to have the look and appearance to compliment the theme or aesthetic of a video game.

The virtual character creation system may provide users 101 with an array of customization options. Users may adjust facial proportions, shape, skin tone, eye color, eyebrow shape, lip color, and other characteristics. Users 101 may modify body proportions, muscle definition, weight, and other physical attributes to accurately represent their physique. Users may mix and match clothing styles, colors, patterns, and accessories to create unique outfits. Users may select from a range of voice options and specify personality traits, influencing the behavior and mannerisms of the virtual character in virtual environments. In some embodiments, one or more algorithms may be used to capture the user's voice and extrapolate the data to be applied for a full range of words.

The virtual character creation system employs advanced graphics rendering techniques to generate high-quality, realistic virtual characters. It leverages texture mapping, shading, and lighting algorithms to create lifelike skin, hair, and clothing materials. Furthermore, the system integrates real-time rendering capabilities, allowing users 101 to preview and interact with their virtual characters in various lighting conditions and environments. The virtual characters created using the system may be seamlessly integrated into virtual environments, gaming platforms, social media platforms, and other applications including the previously mentioned interactive games.

Interactive platform 103 may provide a questionnaire to user 101 to determine one or more attributes for the virtual character including background of the virtual character, relationships, personality traits, and other information or assets. The questionnaire collects important information in order to acquire better guidance in relation to the personalization of the virtual character. The questionnaire may include a short list of ratings or multiple choice questions electronically displayed on computing device 110. User 101 responds to the questionnaire by selecting a response from a multiple choice question or inserting an answer in a text box window to which the customer responds by typing into user interface 120. User 101 may also select an existing character such as one in the public domain like Winnie the Pooh where server 300 may collect existing information on that character to be used during interactions. User's 101 response may then be transmitted to and stored in database 350 with an association of the user's 101 virtual character profile information stored in database 350.

Interactive platform 103 may have a virtual character interaction system accessible through computing device 110 with all interactions stored in database 350. Virtual characters may have one or more specified dialogue and emotion trees to provide questions and answers to users 101 with a specific emotion and intensity. In one or more non-limiting embodiments, interactive platform 103 may have a digital assistant module operable to perform and implement various types of function, actions, and operations for computing devices 110 with input from a microphone and output through speaker. Digital assistant module may be activated in the settings or automatically enabled. Computing device 110 may pick up the voice of a user 101. The digital assistant module may utilize speech to text whereby the digital assistant module generates a set of candidate text interpretations of an auditory signal such as the vocal commands from the user. The digital assistant module may employ statistical language models to generate candidate text interpretations of the auditory signals from user 101 whereby the digital assistant module may analyze the text interpretations and transmit a notification in response. In operation, the audio module may recognize speech from users 101 whereby the phrases are analyzed by interactive platform 103 or server 300 and an answer is produced by the virtual character in response to users 101.

Responses by the virtual character may be trained to generate responses to statements based on previous interactions including dialogue, emotions, and intensity. In some embodiments, interactive platform 103 may construct appearances as well as dialogue, emotions, and intensity of virtual characters based on one or more algorithms whereby the appearances are based on the user's historical patterns or historical patterns of a chosen character (such as an anime character the user likes). Interactive platform 103 may recognize that user 101 has interacted with the virtual character before, whereby after each additional video chat communication, the virtual character may then be generated with an updated appearance such as a new haircut, different outfits, etc. as well as an updated dialogue and emotions tree with a modification to answers. The updated appearance and dialogue and emotions tree may also be altered in correspondence with the day and time as well as the other interactive games that user 101 has played. This provides a more natural feel that will help users be more at ease with a more lifelike construct.

Interactive platform 103 may utilize one or more trained machine learning algorithms that may be of any suitable form and may include, for example, a neural network to create a more lifelike appearance for the virtual character when interacting with user 101 based on previous interactions with user 101 in interactive platform 103 and interactive games. A neural network may be software representing a human neural system (e.g., cognitive system). A neural network may include a series of layers termed "neurons" or "nodes." A neural network may comprise: an input layer to which data is presented; one or more internal layers; and an output layer. The number of neurons in each layer may be related to the complexity of a problem to be solved. Input neurons may receive data being presented and then transmit the data to the first internal layer through connections' weights.

A neural network may include, for example, a convolutional neural network, a deep neural network, or a recurrent neural network. Previous dialogue, emotions, and intensity in conversations between user 101 and the virtual character, dialogue, emotions, and intensity in conversations between other users 101 and their virtual character and between user 101 and other virtual characters, video and audio content of the virtual character and user 101, and interactions with the interactive games, or any outside sources (such as if the virtual character is modeled after an anime character) may be received by the input layer whereby the interface layer may create a cluster that is then applied to present dialogue and reactions of the virtual character. The output layer then uses the variable to generate adjusted dialogue and output images and video to the user. An overall score may also be determined for the positive reaction for each video.

Interactive platform 103 may receive speech or audio inputs from a determined answer and analyze the phonetic content and timing information. It processes the input to identify the specific phonemes, words, or sentences that need to be synchronized with the virtual character's lip movements. Using a combination of machine learning techniques, including deep learning algorithms, the lip sync generation module maps the analyzed phonetic information from the speech analysis module to corresponding lip movements. The module may be trained on a large dataset of human lip movements and speech recordings to learn the mapping between phonetic features and visual cues. Based on the output of the lip sync generation module, the virtual character animation module generates a sequence of keyframes or animation data that represent the lip movements of the virtual character. These keyframes or animation data are synchronized with the speech or audio inputs to create a realistic lip sync effect. A rendering module then takes the generated animation data and applies it to the virtual character model. It utilizes computer graphics techniques to render the virtual character with accurate lip movements, ensuring a visually appealing and lifelike representation to user 101.

Virtual characters may be able to execute procedurally generated animations such that they will not only have preset animations that execute on an action. This may be accomplished by training AI model to create curve and timestamp morphs such that the character executes a certain motion procedurally via AI depending on the application, context, memory and situation it is currently in. AI may include language language models (LLM) to be able to create animation data to feed back into our characters inside of the game and execute the animation data.

The AI model may be used generate realistic and context-sensitive animations for video game characters. Instead of relying solely on pre-recorded animations, this model allows characters to adapt their movements dynamically based on various in-game scenarios and user inputs. Interactive virtual character system 100 may include one or more libraries of motion capture data that includes a variety of movements (walking, running, jumping, fighting, etc.). Each motion capture sequence may tagged with metadata such as the type of movement, intensity, and context for later use.

The AI model may then apply reinforcement learning which trains the model to choose the optimal movement based on the game environment and player actions. The AI model may include one or more neural networks with the input layer, to which data is presented; one or more internal layers; and an output layer. Utilizing the three layers, the neural networks may predict and generate appropriate animations by analyzing the current state of the game and anticipating future states.

Based on the current input, the AI may then select a base animation from the motion capture database. The curve generation algorithm calculates the path the character needs to follow. A timestamp morphing engine determines the timing for each keyframe, ensuring the motion is smooth and fluid. A procedural animation module adjusts the base animation using inverse Kinematics (IK) and Forward Kinematics (FK) to adjust the character's limbs and body positions dynamically. to fit the current context (e.g., character moving uphill).

While conversing in interactive platform 103, server 300 may receive data of the location of the virtual character transmitted from the first or second interactive game which may then may be stored and translated into a two dimensional or three-dimensional backdrop for the virtual character. The virtual character may be able to take in visual data from the game system using a vision model LLM to interpret the image and it will respond accordingly with a speech, physical and emotional response. This memory will be stored in the consciousness of the character and will be able to be referenced in other applications. This backdrop may then be used for the virtual character when conversing with user 101. Dialogue tree and actions may also be adjusted based on the location whereby user 101 may ask questions about the location of which the virtual character may be aware of their surroundings, discussing their location, surroundings, objectives, or otherwise any other situation they are in.

Interactive virtual character system 100 may natively have Optical Character Recognition (OCR) technology (one or more of the computer vision technologies) that may detect and recognize one or more types of objects or environments from the content received and may use any technology currently implemented or known by those of ordinary skill in the art. For example, in some embodiments OCR is a task in computer vision that involves identifying the presence, location, and type of one or more objects or environments in the given image or video of the interactive game for virtual character to recognize.

Once stored, the images may then be converted into numerical vectors that can be used for various machine learning and computer vision tasks. Images may be resized to a consistent resolution to have consistent dimensions. Pixel values may be scaled to a common range (e.g., [0, 1] or [−1, 1]) to have similar intensity characteristics. During the process of modifying the image into a vector the pixel values of the image may be flattened to be used as a vector whereby the intensity of each pixel becomes an element in the vector. The histograms of pixel intensity values may then be computed for different color channels (e.g., red, green, blue) or color spaces.

Interactive virtual character system 100 may utilize any number of deep learning models which can be trained to automatically extract hierarchical features from images and convert them into embedding vectors. This deep learning system could be an encoder-only or an encoder-decoder neural network. The input to the encoder may be any number of images in different formats. The encoder may include Convolutional Neural Network (CNN) or a Transformer architecture for processing images, capturing spatial hierarchies, and extracting features. The layers of the CNN (convolutional layers, pooling layers) or Transformer (attention layers, fully-connected layers) may progressively reduce the spatial dimensions of the image while increasing the depth of the feature maps. The output of the encoder may be a compact representation of the input image in the form of a context vector which encodes its significant features. Optionally, there could be a decoder that transforms the encoded information into a new format, e.g. The decoder may be a transformer that generates a textual description of the image in a standardized format such that it may be used by system for updating virtual character interaction The machine learning model may be based on the CLIP (Contrastive Language-Image Pretraining) architecture and loss function that learns a joint embedding space for language and image. This enables searching across both domains in the same search index, e.g., using text inputs (e.g., natural language search queries) to retrieve from a search index of images or using image inputs to retrieve from a search index of text.

Moreover, the machine learning model may be a foundation model that is pre-trained on millions or even billions of data points. In the case of CLIP, it would be a large dataset of both images and captions. In addition, the machine learning model can be fine-tuned specifically for the fashion domain by collecting a dataset of interactive game images and corresponding descriptions that enables the model to have a better recognition. The captions for the images could be synthetically generated from the partner data. The fine-tuning may use the CLIP loss function or any other loss function that is compatible with the choice of machine learning model architecture.

While visualizing in interactive platform 103, server 300 may receive biofeedback from the sensor system that may be connected to a user 101 monitor how user 101 is reacting to the virtual character as well as gauge any possible adjustments needed for future alignment with their ailments or from inadequate results. This may also be done by any questionnaires and previous data of other users 101. In other non-limiting embodiments, user 101 may also be presented various survey options after a session with the virtual character has concluded in which an overall score may be calculated which then may be included in machine learning or training in curation for future videos.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

What is claimed is:

1. A method for managing a digital asset on one or more platforms, the digital asset comprising a plurality of characteristics including at least one alterable characteristic, the digital asset comprising a virtual character, the method comprising:
   receiving a prompt from user input from a user;
   analyzing the prompt for past experiences, behavior, current environment, current application, and mood of the virtual character;
   storing the prompt for pre-processing of the virtual character;
   sending the prompt and an animation list to an external API;
   determining character audio response, visemes, and timing for the virtual character;
   transmitting the audio response, the visemes, and the timing through the virtual character to the user;
   sending the virtual character to a first media source including the at least one alterable characteristic, wherein performance of the first media source is affected by the at least one alterable characteristic;
   receiving data from the first media source for altering the at least one alterable characteristic based on an interaction in the first media source;
   altering, the at least one alterable characteristic in the digital asset based on the received data;
   sending the digital asset data including the at least one altered characteristic to a second media source independent of the first media source, wherein performance of the second media source is affected by the at least one altered characteristic; and
   sending the digital asset data to an interactive platform enabling a user to access the digital asset independent of the first media source or the second media source.

2. The method of claim 1, wherein the first media source is a video game and the second media source is a non-interactive movie or puzzle.

3. The method of claim 1, presenting the virtual character in augmented reality view wherein the virtual character is displayed in a physical world and can simulate walking around and interacting with the physical world and interacting verbally with the user.

4. The method of claim 1, further comprising: altering a texture or geometry of the virtual character to generate a look and appearance in response to a theme of aesthetic of the first media source or the second media source.

5. The method of claim 1, further comprising: storing information learned from another character or NPC in the first media source or the second media source and utilizing it for the pre-processing.

6. The method of claim 4, further comprising: storing game statistical information from the first media source or the second media source and utilizing it for the pre-processing.

7. The method of claim 1, further comprising: providing one or more specified dialogue and emotion trees to provide one or more responses through the interactive platform.

8. The method of claim 1, further comprising: training the one or more responses based on previous interactions in the interactive platform, the first media source, and the second media source including dialogue, emotions and intensity.

9. The method of claim 1, further comprising: training the one or more responses based on previous interactions in the interactive platform with one or more second virtual characters and one or more second users.

10. The method of claim 1 further comprising, receiving requests and identification information from the first media source and the second media source and the interactive platform;

sending the digital asset data to the first media source and the second media source and the interactive platform; and and receiving data from the first media source and the second media source and the interactive platform for altering one or more alterable characteristics.

11. The method of claim 10, further comprising presenting a questionnaire subsystem in the interactive platform to determine one or more attributes of the digital asset and designed to ascertain a background, a relationship, or a personality trait.

12. The method of claim 10, further comprising: providing interaction system wherein the digital asset has one or more specified dialogue and emotion trees to provide responses through an interactive platform user interface on a user computing device.

* * * * *